July 1, 1969  R. W. KENT, JR., ET AL  3,453,356
MIXING OF FILAMENTARY REINFORCING MATERIAL WITH
THERMOPLASTIC RESINS
Filed Feb. 24, 1964

INVENTORS.
Raymond W. Kent Jr.
Kenneth R. Hock
BY
AGENT
ATTORNEY

United States Patent Office 3,453,356
Patented July 1, 1969

3,453,356
MIXING OF FILAMENTARY REINFORCING
MATERIAL WITH THERMOPLASTIC RESINS
Raymond W. Kent, Jr., and Kenneth R. Hock, Midland, Mich., assignors to The Dow Chemical Company, Midland, Mich., a corporation of Delaware
Filed Feb. 24, 1964, Ser. No. 346,800
Int. Cl. B29f 3/02
U.S. Cl. 264—143
4 Claims

ABSTRACT OF THE DISCLOSURE

Filamentary reinforcing such as glass fiber is added to thermoplastic material such as polystyrene by adding chopped fiber to the volatile port of an extruder, preferably twin screw, through which the molten polymer is passing. Minimum fiber breakage is obtained.

---

Figure 1:
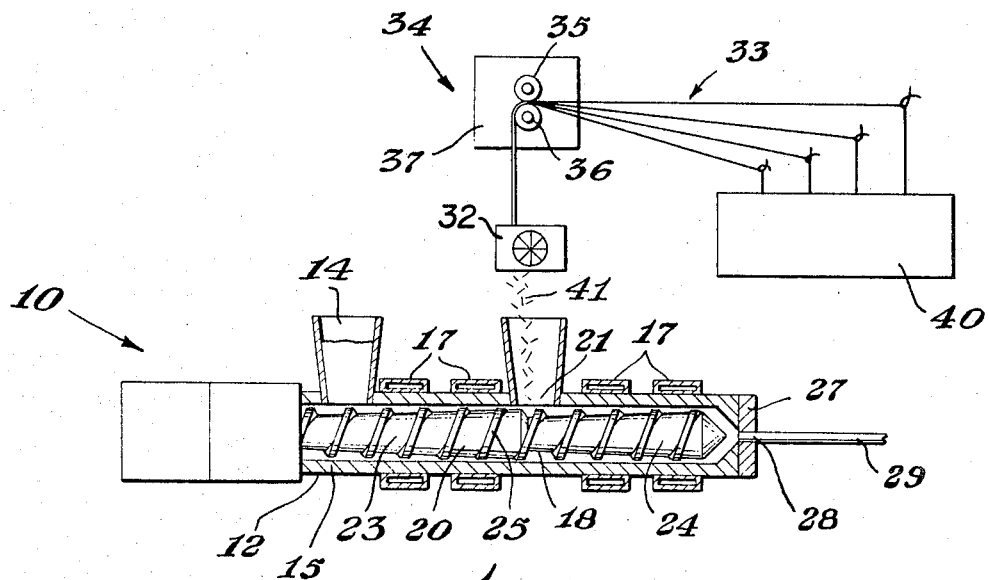

This invention relates to the mixing of filaments or fibers with a thermoplastic resinous material. It more particularly is concerned with a continuous method of accomplishing this end.

Filaments, fibers, and the like have been used for the reinforcing of heat fabricated thermoplastic resinous materials such as polystyrene, polyvinylchoride, nylon 66 (a condensation copolymer of hexamethylene diamine and adipic acid), ethyl cellulose, cellulose acetate, as well as many copolymeric compositions. Various methods have been employed to produce a suitable mixture of a filamentary reinforcing agent and a thermoplastic resinous material. Many of these efforts have been directed toward glass fibers or filaments as desirable physical properties are achieved when from about 10 to 50 percent by weight of the thermoplastic resinous composition comprises filamentary glass. Glass filaments are somewhat brittle and they tend to fracture with mechanical working. Therefore a number of methods have been developed for the incorporation of such glass fibers and filaments into a resinous mass. In general, known methods of preparing such mixtures suffer from the serious disadvantage of requiring expensive and time consuming operations, or, if such operations are not time consuming and expensive, they result in admixture of the filaments and the resinous material which are not generally satisfactory for most uses as the filaments have been broken or shortened to a length where significant reinforcement is not obtained.

It is an object of this invention to provide an improved process for the intimate admixture of a thermoplastic resinous material with a filamentary reinforcing agent.

A further object of the invention is to provide a method of making a molding granule comprised of a thermoplastic resinous matrix having dispersed therein a filamentary reinforcing agent.

Another object of the invention is to provide a low cost method of manufacturing a filamentary reinforced thermoplastic resinous material in the form of molding granules.

These benefits and other advantages in accordance with the present invention are achieved by heat plastifying a thermoplastic resinous composition in a screw extruder having a volatile port and adapted to forward the heat plastified material through an extrusion orifice, the steps of the method comprising heat plastifying the thermoplastic resinous material in a screw extrusion apparatus while maintaining in the barrel of the extruder adjacent the volatile port a quantity of resinous material insufficient to cause flow of the material out of the volatile port, adding to the volatile port a filamentary reinforcing material in the form of filaments while maintaining the viscosity of the heat plastified thermoplastic resinous material between about 300 poise and about $10^6$ poise (viscosities are determined by measuring apparent viscosities at varying shear rates and extrapolating to determine the value of zero shear), maintaining a flow of the filamentary reinforcing agent into the volatile port sufficient to provide the desired quantity of reinforcing material in the extruded composition, the proportion being between about 10 percent and about 50 percent by weight based on the weight of the extruded composition of filamentary reinforcing material.

Figure 2:
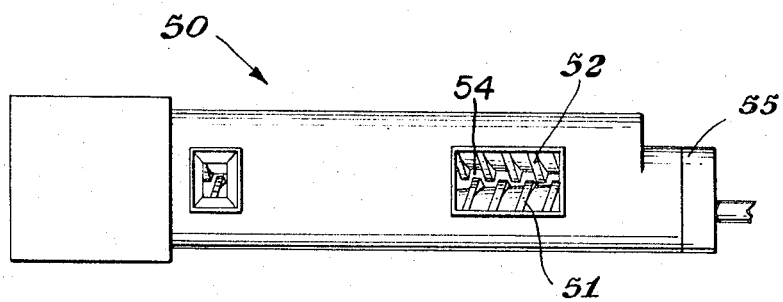

The method of the present invention is schematically illustrated in FIGURE 1;

FIGURE 2 illustrates a preferred embodiment of extruder screw arrangement.

In FIGURE 1 there is illustrated a mixing apparatus designated by the reference numeral 10. The mixing apparatus comprises in cooperative combination an extruder 12. The extruder 12 comprises a resin supply 14 in communication with an extruder barrel 15. The extruder barrel 15 has operatively associated therein barrel heating means or bands 17. The barrel 15 defines an internal cavity 18 which has disposed therein a worm or screw 20. A passageway or volatile port 21 provides communication between the cavity 18 and the exterior surface of the barrel 15. The screw 20 comprises two general portions, a forwarding and heat plastifying portion 23 and a mixing and forwarding portion 24. The portions 23 and 24 are separated by a restrictor 25. The barrel 15 is terminated remote from the resin supply 14 by a dieplate or die 27. The die 27 is an extrusion orifice 28. A thermoplastic resinous shaped article 29 issues from the orifice 28. A comminuting device 32 is positioned generally adjacent to the volatile port 21. A plurality of harl or rovings 33 are fed to the chopper 32 by the feed means 34 which comprises a pair of driven pinch rolls 35 and 36 and a drive means 37. The rovings 33 are drawn from the harl or roving supply 40, passed into the chopper 32 from which issues a stream of chopped filaments 41 which are discharged into the volatile port 21 at a location generally adjacent to the restrictor 25. Thus, utilizing the apparatus of FIGURE 1, a heat plastified thermoplastic resinous material is confined within a chamber having a pumping or forwarding means therein and filamentary reinforcing material is continuously added to the molten or heat plastified polymeric material and is blended and admixed by the forwarding screw and subsequently extruded as a shaped article having a filamentary reinforcing therein.

In FIGURE 2 there is schematically illustrated a particularly advantageous and beneficial form of mixing device generally designated by the reference numeral 50. The mixing device 50 is a twin screw extruder. The extruder has a first screw 51, a second screw 52, and an elongated volatile port 54. The twin screws 51 and 52, when rotated in the proper manner, forward the contents of the extruder barrel toward a die 55 and provide an especially beneficial mixing action which serves to incorporate a filamentary reinforcing material such as filamentary glass or Fiberglas to the polymer with a minimum of reinforcement damage or breakage.

The method of the invention may be practiced with any thermoplastic resinous material which is heat formable and benefits from the incorporation of filamentary reinforcing material.

Typical thermoplastic resinous materials which may be utilized include the alkenyl aromatic resins typified by polystyrene, styrene copolymers, blends and graft copolymers of styrene and rubber and the like. The invention is readily practiced utilizing polyvinylchloride, vinylidene chloride copolymers such as are generally known as sarans; superpolyamides, such as nylon 66 (a condensation product of hexamethylene diamine and adipic acid);

the polyolefins including polyethylene, polypropylene and resinous copolymers thereof, ethyl cellulose, cellulose acetate, rubbers both natural and synthetic including polybutadiene, polyisoprene including the chlorinated derivatives, mixtures thereof, and the like.

A wide variety of filamentary reinforcing agents may be utilized including certain thermoplastic materials when utilized with other resinous materials which have a significantly lower heat-forming temperature than does the reinforcing material. Particularly advantageous and beneficial are the thermoplastic resinous compositions utilizing filamentary glass or Fiberglas as a reinforcing medium. Beneficially such filaments are used in lengths from about 0.05 inch to about 2 or more inches depending upon the characteristics of the product desired and the equipment available. Usually, however, the advantageous range is from about 0.1 inch to about 0.75 inch. Polycarbonate resins are also beneficially employed. The particularly suitable polymers for use in the present invention are those that, when heat plastified, have a viscosity of between about 300 poise and about $10^6$ poise. If the viscosity range is below about 300 poise, generally the filamentary material is prone to separate under the influence of gravity and the clearances required for pumping and forwarding in an extruder become so close that considerable fiber damage is done and a beneficial product does not result. If the heat plastified resin has a viscosity greater than about $10^6$ poise the stresses placed on the reinforcing material is often too great and significant strength is lost in the resultant product. Even with the lower viscosity materials, regions of high shear must be avoided, thus the requirement for the invention that the reinforcing strands be placed upon a bed of molten polymer material which is being agitated. Other factors may reduce the reinforcing filaments in length such as, for example, a small extrusion orifice wherein the polymeric material is being extruded under conditions which cause turbulence. If the polymer is required to pass over a sharp edge, such as a rectangular edge of a hole formed normal to the die plate, the fibers adjacent the sharp edges are subjected to sever shear. Optimum mixing or blending action is obtained in a twin screw extruder with the screws rotating toward each other (as viewed from above the extruder) when the filamentary reinforced material is added to the nip of agitating heat plastified polymer between the screws through a suitable feed port such as a volatile port. In practicing the method of the present invention, either a twin screw extruder or a single screw extruder may be utilized. When a single screw extruder is employed, the screw must have deep flights and be capable of forwarding the polymer rapidly away from the volatile port toward the extrusion die.

In the practice of the method of the present invention the feed to the extruder must be controlled in such a manner that the barrel of the extruder adjacent the volatile port to which the fibrous or filamentary material is added provides a polymer free space within the barrel adjacent the port and preferably extruding into the barrel slightly beyond the port. Thus there is an exposed surface of moving polymer onto which the reinforcing filaments are applied. As the polymeric material is continuously moving the filamentary reinforcing agent is wetted by and dispersed in the polymer.

In practicing the method of the present invention the following generalizations may be made. With all other variables held constant, an increase in agitation or screw speed results in a decrease in the impact strength of the product. A rise in temperature of the thermoplastic resinous material in the barrel generally increases the impact strength. An increase in the extrusion rate also causes an increase in the impact strength. Such variations, of course, are made in and about the normal operating temperatures and speeds for a particular polymer or extruder and may not hold true under extreme or unrealistic conditions.

By way of further illustration, a plurality of Fiberglas reinforced compositions are prepared in the following manner utilizing a welding engineer's two inch twin screw extruder. The extruder has two 2 inch diameter screws about 36 inches in length and shaped to form a restriction in the barrel generally in the manner of the screw of FIGURE 1. The total length of the barrel and die from feed hopper to extrusion orifice is 42 inches. In the barrel is an upwardly facing rectangular port measuring 5 inches across and 12 inches in length. The front of the port is located about 13 inches from the dieface. The extruder has a jacketed barrel and provision for oil heating. The polymer composition or resin is added to the extruder hopper and the barrel heated to a suitable temperature for the particular resinous material empolyed, the speed of the screws is adjusted to provide a desired output rate while maintaining, generally polymer free, the portion of the barrel adjacent the volatile port and above the counter rotating screws. Glass roving having 60 ends and a diameter of 0.00135 inch is chopped and continuously fed as a falling layer or stream of filaments into the portion of the volatile port remote from the die. The feed rate of the chopped roving is adjusted then to provide the desired polymer reinforcing agent ratio. The extruded polymer-

TABLE

| Polymer type | Extrusion temperature (° F.) | Production rate (lbs./hr.) | Percent glass | Extrusion, r.p.m. | Notched Izod impact | Tensile strength |
|---|---|---|---|---|---|---|
| 1 | 438 | 34 | 20 | 130 | 1.65 | 11,600 |
| 2 | 464 | 35 | 20 | 130 | 1.85 | 12,500 |
| 3 | 438 | 34 | 20 | 130 | 2.48 | 5,600 |
| 4 | 438 | 36 | 25 | 130 | 3.05 | 6,000 |
| 5 | 482 | 36 | 20 | 130 | 2.41 | 10,400 |
| 6 | 492 | 37 | 20 | 130 | 2.50 | 9,000 |
| 7 | 380 | 40 | 30 | 130 | 2.4 | 12,000 |
| 8 | 510 | 50 | 30 | 130 | 2.6 | 15,000 |
| 9 | 400 | 35 | 30 | 130 | 10.0 | 14,000 |
| 10 | 350 | 35 | 30 | 130 | 2.5 | 9,000 |
| 11 | 480 | 35 | 30 | 130 | 2.0 | 20,000 |
| 12 | 350 | 35 | 30 | 130 | 5.0 | 15,000 |
| 13 | 470 | 35 | 30 | 130 | 3.5 | 16,000 |

1. A copolymer of 65% methyl methacrylate and 35% styrene.
2. A copolymer of 65% methyl methacrylate and 35% styrene having a 10% by weight toluene solution viscosity at 25°C. of 11.5 centipoise.
3. and 4. Linear polypropylene, melt index of 7.5.
5. Polystyrene having a solution viscosity of 22 centipoise as a 10% solution in toluene at 25° C.
6. A rubber reinforced polystyrene containing 6% polybutadiene rubber.
7. A homogeneous mixture comprised of 50% of a copolymer of 30 parts acrylonitrile, 70 parts styrene, and 50% polyvinylchloride.
8. Copolymer of 70 parts of styrene and 30 parts of acrylonitrile.
9. Ethyl cellulose, molding grade.
10. Polyvinylchloride containing 10% by weight dioctyl phthalate.
11. Nylon 66, a copolymer of hexamethylene diamine and adipic acid.
12. Cellulose acetate, molding grade.
13. A polycarbonate resin having a melt viscosity of 767 centipoise at 510° C.

glass composition is cut into ⅜ of an inch by ⅜ of an inch cylinders and molded into test bars. The tensile strength of the test bars is determined in accordance with the American Society for Testing Materials Standard D638–60T. The notched Izod impact is determined in accordance with the ASTM Standard D638–56 at a temperature of 73° Fahrenheit. The test bars are prepared from a molding made by a Watson Stillman 1 ounce ram injection molding machine. The bars measure about ⅛ by ½ by 6 inches. All test bars are molded at a melt temperture of 525° Fahrenheit utilizing 600 pounds per square inch ram pressure into a mold at a temperature of 150° Fahrenheit. The results are set forth in table in Column 4.

In a manner similar to the foregoing illustration, other filamentary articles, such as asbestos fibers as well as high melting synthetic fibers, are readily incorporated into vinylidene chloride copolymers, polyethylene, natural rubber, butadiene styrene rubbers, chlorinated butadiene-styrene rubber, chlorinated natural rubber, when heat plastified to a melt viscosity of from about 300 to $10^6$ poise similar commensurate and beneficial results are achieved.

In a like manner, such additions are made utilizing a single extruder screw provided with a suitable volatile port and a running clearance of at least 0.05 inch between the screw and the barrel.

As is apparent from the foregoing specification, the method of the present invention is susceptible of being embodied with various alterations and modifications which may differ particularly from those that have been described in the preceding specification and description.

What is claimed is:

1. A method of incorporating a filamentary material within a synthetic resinous material comprising heat plastifying a thermoplastic resinous composition in a screw extruder having a volatile port and adapted to forward heat plastified material through an extrusion orifice, the steps of the method comprising heat plastifying a thermoplastic resinous material in a screw extrusion apparatus while maintaining in the barrel of the extruder adjacent the volatile port a quantity of resinous material insufficient to cause flow of the material out of the volatile port, adding to the volatile port a filamentary reinforcing material in the form of filaments having a length of up to about 2 inches while maintaining the viscosity of the heat plastified thermoplastic resinous material between about 300 poise and about $10^6$ poise, maintaining a flow of the filamentary reinforcing agent into the volatile port sufficient to provide the desired quantity of reinforcing material in the extruded composition, the proportion being between about 10 percent and about 50 percent by weight based on the weight of the extruded composition of filamentary reinforcing material, whereby a minimum of reinforcing damage or breakage occurs.

2. The method of claim 1 wherein the filamentary reinforcing material is glass.

3. The method of claim 2 including the step of subsequently cooling the extruded material and dividing it into a particulate mass.

4. The method of claim 1 wherein the screw extruder is a twin screw extruder.

References Cited

UNITED STATES PATENTS

| | | | |
|---|---|---|---|
| 2,736,058 | 2/1956 | Dellheim. | |
| 3,003,194 | 10/1961 | Hunkeler. | |
| 3,164,563 | 1/1965 | Maxwell et al. | 264—143 |
| 3,192,564 | 7/1965 | Beck et al. | |
| 3,068,514 | 12/1962 | Street. | |
| 3,230,192 | 1/1966 | Mazurk | 264—185 X |

ROBERT F. WHITE, *Primary Examiner.*

S. I. LANDSMAN, *Assistant Examiner.*

U.S. Cl. X.R.

264—176

Disclaimer 3,453,356.—*Raymond W. Kent, Jr.* and *Kenneth R. Hock,* Midland, Mich. MIXING OF FILAMENTARY REINFORCING MATERIAL WITH THERMOPLASTIC RESINS. Patent dated July 1, 1969. Disclaimer filed May 24, 1972, by the assignee, *The Dow Chemical Company.*

Hereby enters this disclaimer to claims 1–4, inclusive, of said patent.

[*Official Gazette March 6, 1973.*]